Figure 3:
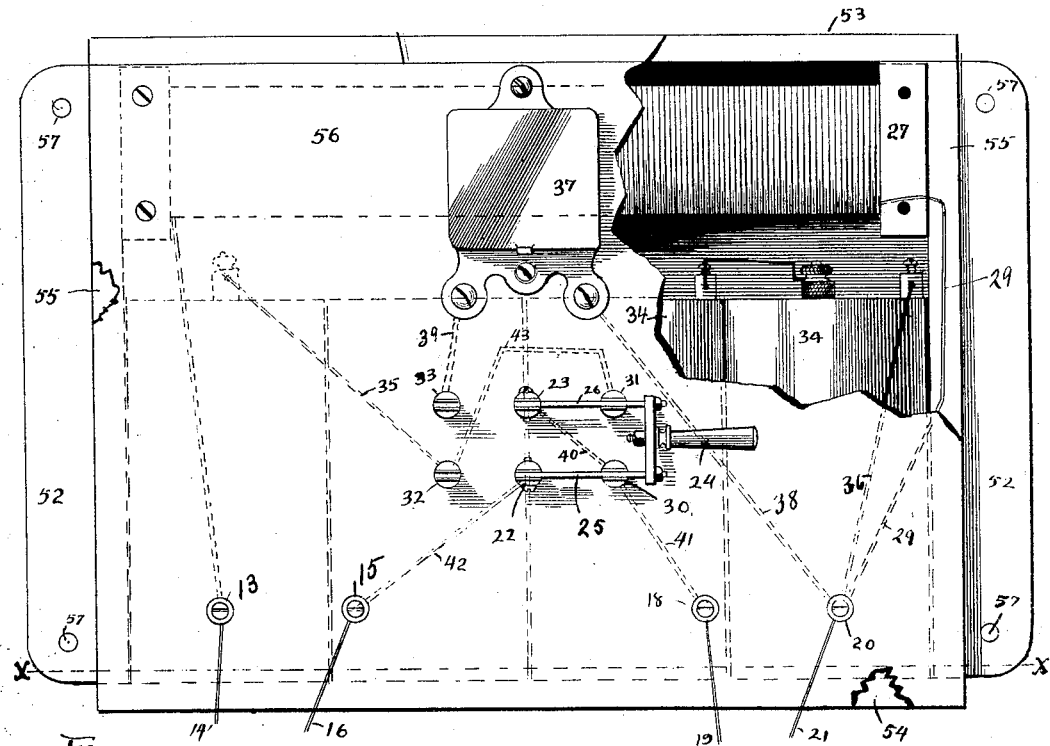

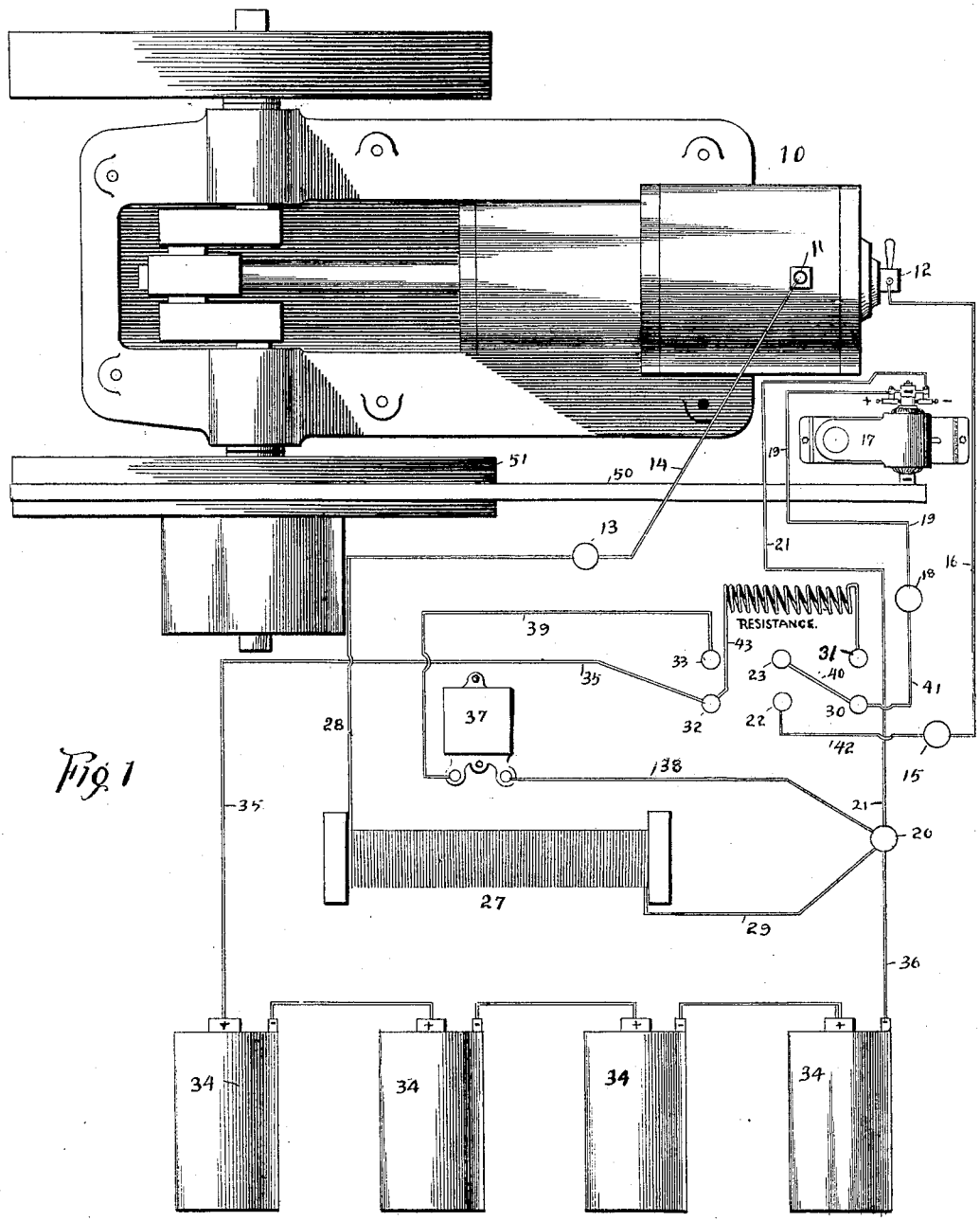
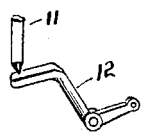

(No Model.) 2 Sheets—Sheet 2.

V. G. APPLE.
IGNITING MEANS FOR EXPLOSIVE ENGINES.

No. 591,123. Patented Oct. 5, 1897.

WITNESSES
L. C. Leoly
K. E. Koehne

INVENTOR
Vincent G. Apple
BY
W. C. Koehne
ATTORNEY.

UNITED STATES PATENT OFFICE.

VINCENT G. APPLE, OF MIAMISBURG, OHIO.

IGNITING MEANS FOR EXPLOSIVE-ENGINES.

SPECIFICATION forming part of Letters Patent No. 591,123, dated October 5, 1897.

Application filed April 22, 1897. Serial No. 633,234. (No model.)

*To all whom it may concern:*

Be it known that I, VINCENT G. APPLE, a citizen of the United States, residing at Miamisburg, in the county of Montgomery and State of Ohio, have invented a new and useful Improvement in Igniting Means for Explosive-Engines, of which the following is a specification, reference being had to the drawings and appended claims.

My invention relates, primarily, to improvements in means for producing an igniting-spark to explode gas and other explosive engines and analogous apparatus. However, my invention may also be employed for other purposes where it is desired to successively produce an igniting or other spark by electrical means.

In the embodiment of my invention I essentially employ a dynamo, a battery, and a spark-coil, all in circuit with the contact-points in the firing-chamber of the gas or other explosive engine. The battery, which may be any desirable form of primary or secondary cells, is employed to furnish an electric current sufficient to cause the first few explosions until the engine has developed normal speed, when by moving a suitable switch in the circuit the dynamo is directly connected with the contact-points in or on the explosive-engine, and the battery or batteries are preferably by the same movement of the switch thrown into a subcircuit from the dynamo, and some of the dynamo-current is shunted through the batteries by an intermediate resistance-coil (or equivalent) in this subcircuit for the purpose of replenishing or strengthening the batteries. I have discovered that any primary battery of the dry-cell, the Edison-Lalande, and analogous types may be renewed and strengthened by "shunting" a current through them when not in use on the main circuit. This discovery I have utilized in this invention, of which it is a special feature, in view of the fact that the cost of battery-renewals are almost eliminated. Any form of ordinary secondary battery may, if convenient or desirable, be employed in place of either of the types of primary batteries mentioned. When the battery is directly in circuit with the contact-points in or on the explosive-engine, I arrange an alarm which is then in connection with the dynamo, said alarm being adapted to be sounded, when said dynamo is generating its normal current, as a signal, which continues sounding until the switch is turned to shift the batteries out and the dynamo into the main circuit with said contact-points.

My invention consists in these new combinations, constructions, arrangements, and connections of the several parts, as will be hereinafter described, and particularly mentioned in the appended claims.

In the drawings, Figure 1, Sheet 1, represents a plan view of an explosive-engine of well-known form and a diagrammatical plan view of the arrangement and connections of my invention. Fig. 2, Sheet 1, is a perspective view of the contact-points for said explosive-engine. Fig. 3, Sheet 2, is a front elevation of a cabinet containing the battery, spark-coil, alarm, and switch, with their connections, employed in my invention, part of the front of said cabinet being broken away to show parts beneath; and Fig. 4, Sheet 2, is a sectional end elevation on line X X of Fig. 3.

Like figures of reference are employed throughout the drawings and specification to designate identical parts.

In the drawings, 10 represents the explosive-engine, which may be of any well-known and ordinary form; 11, its contact-point provided with the usual means of adjustment for wear, and 12, Figs. 1 and 2, the contact-point which is caused to successively contact with the point 11 by the usual means operating with or by said explosive-engine. The point 11 is connected with the binding-post 13 by wire 14, while the point 12 is connected with the binding-post 15 by wire 16.

17 represents a dynamo of small type and very low voltage. The positive pole of dynamo 17 is connected to binding-post 18 by wire 19, while the negative pole of said dynamo is connected to binding-post 20 by wire 21.

Figure 4:
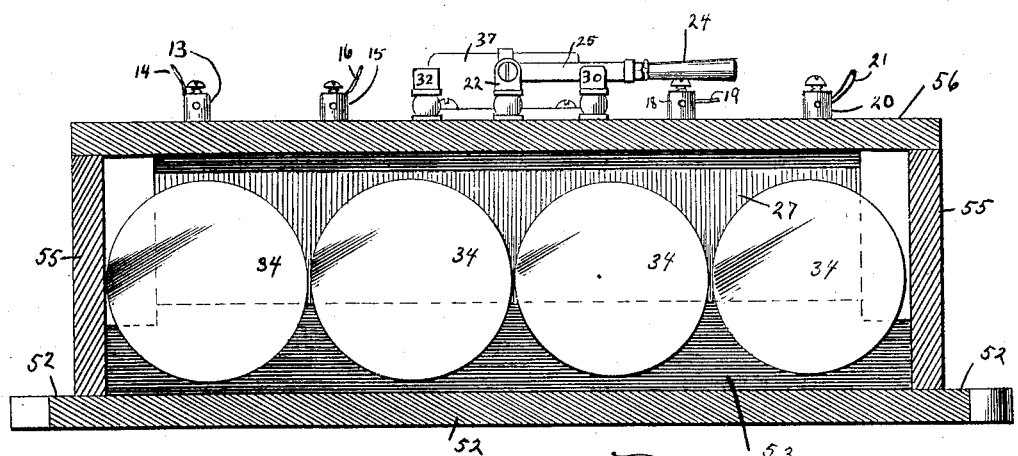

22 and 23 represent the two posts to which the ordinary form of switch 24, Figs. 3 and 4, is pivoted, respectively, by its blades 25 and 26. The spark-coil 27 is connected to binding-posts 13 and 20, respectively, by wires 28 and 29.

30, 31, 32, and 33 represent the switch contact-posts, Figs. 1, 3, and 4.

34 represents the battery, which may consist of one or more cells of the ordinary primary or secondary cells; but in the present instance I prefer to employ, for cheapness and convenience, the ordinary form of dry-cell battery. The positive pole of the battery 34 is connected by wire 35 to switch contact-post 32, while the negative pole of battery 34 is connected by wire 36 with binding-post 20.

37 represents an electrical alarm, which may be either an ordinary form of electric bell or an alarm device commonly called a "buzzer." This alarm 37 is connected to binding-post 20 and switch contact-post 33, respectively, by wires 38 and 39. The switch pivot-post 23 is connected to the switch contact-post 30 by wire 40, while the binding-post 18 is connected to the switch contact-post 30 by wire 41. The switch pivot-post 22 is connected to binding-post 15 by wire 42. The switch contact-posts 31 and 32 are connected by a wire 43, which wire 43 may contain a resistance-coil whenever the resistance of the battery 34 is insufficient and whenever secondary batteries are employed. With the form of dry-cell battery which I have employed it has been ascertained that the battery itself furnishes sufficient resistance without placing a resistance-coil in the wire 43. However, when the secondary battery is employed a resistance-coil is deemed necessary in or to shunt current from the dynamo through said battery to charge the same.

When the switch-blades 25 and 26 are in contact with their respective switch contact-posts 32 and 33, the battery 34 is in circuit with the contact-points 11 and 12, the circuit being from contact-point 12 through wire 16 to binding-post 15, from binding-post 15 through wire 42 to switch pivot-post 22, thence through the switch-blade 25 to switch contact-post 32, thence through wire 35 to the positive pole of battery 34, from the negative pole of battery 34 through wire 36 to binding-post 20, thence through wire 29 to spark-coil 27, thence through wire 28 to binding-post 13, and thence through wire 14 to contact-point 11. The circuit remains as thus described until the dynamo 17, driven by the explosive-engine 10, is generating its normal current, when said dynamo-current flows through wire 19 to binding-post 18, thence through wire 41 to switch contact-post 30, thence through wire 40 to switch pivot-post 23, thence through switch-blade 26 to switch contact-post 33, thence through wire 39 to alarm 37, thence through wire 38 to binding-post 20, and thence through wire 21 to the negative pole of dynamo 17. The current passing through this circuit thus described will continually sound the alarm 37 until the switch 24 is moved and its blades 25 and 26 placed in contact with the respective switch contact-posts 30 and 31, when said dynamo 17 is in direct circuit with the contact-points 11 and 12 as follows: From positive pole of dynamo 17 through wire 19 to binding-post 18, thence through wire 41 to switch contact-post 30, thence through switch-blade 25 to switch pivot-post 22, thence through wire 42 to binding-post 15, thence through wire 16 to contact-point 12, from contact-point 11 through wire 14 to binding-post 13, thence through wire 28 to spark-coil 27, thence through wire 29 to binding-post 20, thence through wire 21 to the negative pole of dynamo 17. The replenishing or restoring current from the dynamo 17 is passed or shunted from switch contact-post 30 through wire 40 to switch pivot-post 23, thence through switch-blade 26 to switch contact-post 31, thence through wire 43 to switch contact-post 32, thence through wire 35 to the positive pole of battery 34, thence from negative pole of battery 34 through wire 36 to binding-post 20, &c. It will thus be seen that when the switch-blades 25 and 26 are contacting, respectively, with their switch contact-posts 30 and 31 the dynamo 17 is in direct circuit with the contact-points 11 and 12, and, furthermore, that some of the current from said dynamo is being shunted or passed through the battery 34 to replenish or restore the same. It will furthermore be observed that when the contact-point 12 is moved by an operation of the explosive-engine 10 into and out of engagement with its contact-point 11 a strong igniting-spark is produced sufficient to explode the combustible gases in the explosive-chamber of the engine 10. It will also be observed that the dynamo 17 is driven by belt 50 over pulley 51, driven by the engine 10.

Thus far I have described my invention more particularly with reference to the diagramatical showing of the arrangement and connections in Fig. 1; but by referring to Figs. 3 and 4 it will be observed that said description likewise applies to said Figs. 3 and 4, with the addition that the battery 34 and spark-coil, with their electrical connections, are suitably mounted within a cabinet formed of back 52, having top wall 53, bottom wall 54, side walls 55, and front wall 56, all secured together. The back wall 52 is provided with a series of openings 57, adapted to receive screws or other fastenings to screw said cabinet to a convenient post or wall. Secured to and projecting from the front wall 56 are binding-posts 13, 15, 18, and 20, and switch pivot-posts 22 and 23, and the switch contact-posts 30, 31, 32, and 33. The switch 24 is at all times exposed upon the front wall 56, (see Figs. 3 and 4,) likewise is the alarm 37. However, the connections between the battery 34, spark-coil 27, alarm 37, and the several binding and switch posts are all concealed beneath the front wall 56 and within the cabinet, the only wires or connections exposed being wires 14 and 16, respectively, connecting binding-post 13 with contact-point 11 and binding-post 15 with contact-point 12, as well as wires 19 and 21, respectively, connecting binding-post 18 with the positive pole of dynamo 17 and binding-post 20 with the negative pole of dynamo 17.

Having now so fully described my invention that others skilled in the art can make and use the same when this exclusive grant shall cease to operate, what I claim, and desire to secure by Letters Patent, is—

1. In an igniter for explosive-engines, the combination with an explosive-engine and contact-points therein, of a dynamo driven by said engine and in circuit with said contact-points, a battery also in circuit with said contact-points, an electric alarm, and a switch and connections adapted to cause said battery to furnish current to cause the first few explosions until said engine is driving said dynamo at normal speed, when said dynamo develops current to sound said alarm which ceases only when said switch is moved to bring only said dynamo in circuit with said contact-points.

2. In an igniter for explosive-engines, the combination with an explosive-engine and current-breaking points operated thereby, of a dynamo driven by said engine, a battery, a switch, a circuit in which are located said points, and switch and separate connections between said switch and said battery and dynamo, said switch being adapted to temporarily throw only said battery in circuit with said contact-points, and then substitute only said dynamo for said battery, substantially as specified.

3. In an igniter for explosive-engines, the combination with an explosive-engine, contact-points therein, and means for operating said contact-points at predetermined intervals by the operation of said engine, of a dynamo driven by said engine, a battery, an electric circuit in which are located said contact-points, a switch and connections for placing at will said battery or said dynamo in said circuit with said contact-points, and means for shunting or passing some of the dynamo-current through said battery only when said dynamo is in circuit with said contact-points.

4. The combination with an explosive-engine, and contact-points therein and operated thereby, of a dynamo driven by said engine; a battery; a switch; and electrical connections arranged between said contact-points, battery, dynamo and switch in such manner that said battery or said dynamo may at will be in circuit with said contact-points, and when said dynamo is in said circuit, some of the dynamo-current is being shunted or passed through said battery.

5. The combination with two sources of electrical energy, one of which being a battery of the ordinary dry-cell or Edison-Lelande and analogous types, of electrical connections and a switch adapted to temporarily substitute said battery for said other source of electrical energy; and means for shunting or passing current through said battery from said other source, while said battery is displaced, substantially as specified.

6. The combination of a dynamo, a battery of the dry-cell or Edison-Lelande and analogous types, an electric circuit in which said dynamo is normally located, a switch and connections for temporarily displacing said dynamo for said battery in said circuit, and means for shunting or passing only a small part of the current from said dynamo through said battery only when said dynamo is in said circuit, whereby said battery is strengthened or replenished.

7. The combination with an explosive-engine, and current-breaking points operated thereby, of a dynamo, a battery, a spark-coil, a circuit in which are located said points and said spark-coil, a switch in said circuit, separate connections between said switch and said battery and dynamo for placing either the battery or said dynamo in the circuit with said contact-points, and means for shunting or passing some of the dynamo-current through said battery when said dynamo is in circuit with said points, substantially as specified.

8. The combination with an explosive-engine, and contact-points therein and operated thereby, of a dynamo driven by said engine, a battery, a spark-coil and an alarm all having electrical connections with said contact-points through an intermediate switch adapted first to place said battery in circuit with said contact-points until said dynamo is generating sufficient current to sound said alarm, when said switch is operated to throw said battery out and said dynamo in circuit with said contact-points, substantially as specified.

9. The combination with the explosive-engine having contact-points 11 and 12 operated thereby, of a dynamo driven by belt 50 from wheel 51 on said engine, a battery 34, a spark-coil, switch pivot-post 22 and switch contact-posts 30 and 32, an electrical connection between contact-point 12 and post 22, an electrical connection between post 32 and the positive pole of battery 34, an electrical connection from the negative pole of said battery through the spark-coil to the contact-point 11, wires 21 and 38 connected to said connection between the negative pole of battery 34 and said spark-coil; said wire 38 leading to alarm 37 connected by wire 39 to switch contact-post 33; wire 43 connecting the switch contacting-posts 31 and 32; wire 40 between switch pivot-post 23 and switch contact-post 30; said post 30 being electrically connected to positive pole of said dynamo, while its negative pole is connected to wire 21; and switch-blades 25 and 26 respectively pivoted to posts 22 and 23, said switch-blade 25 being adapted to contact with either post 30 or 32, while said switch-blade 26 is adapted to contact with either post 31 or 33, substantially as specified.

10. The combination with a cabinet, of a battery and a coil inclosed within said cabinet; binding-posts 13, 15, 18, and 20 and switch-posts 22, 23, 30, 31 and 32 mounted upon and projecting from said cabinet; said coil being electrically connected to posts 13 and 20; an electrical connection between posts 15 and 22, and between posts 18 and 30; the positive and negative poles of said battery being respectively connected to posts 32 and 20; an electrical connection between posts 18 and 30 and 23, also between posts 31 and 32; switch-blades 25 and 26 pivoted respectively to posts 22 and 23, said blade 25 being adapted to contact at will with post 30 or post 32, while said blade 26 is adapted at will to contact with or remain free from post 31; a dynamo in circuit with posts 18 and 20; and a working circuit connected to posts 13 and 15, substantially as specified.

11. The combination with a cabinet, of a battery and a coil inclosed within said cabinet; binding-posts 13, 15, 18 and 20 and switch-posts 22, 23, 30, 31 and 32 mounted upon and projecting from said cabinet; an electrical connection within said cabinet and connecting said coil with posts 13 and 20; electrical connections within said cabinet and between posts 15 and 22 and between posts 18 and 30; an electrical connection within said cabinet and connecting the positive and negative poles of said battery respectively with posts 32 and 20; electrical connections inclosed within said cabinet and connecting posts 18, 30 and 23, also posts 31 and 32; switch-blades 25 and 26 pivoted respectively to posts 22 and 23 and exposed upon the face of said cabinet; a handle 24 secured to said blades 25 and 26; said blade 25 being adapted to contact at will with post 30 or post 32, while said blade 26 is adapted at will to contact with or remain free from post 31; a dynamo exposed connections between said dynamo and posts 18 and 20; and an exposed working circuit connected to posts 13 and 15, substantially as specified.

12. The combination with a cabinet, of a battery and a coil, binding-posts 13, 15, 18, and 20 and switch-posts 22, 23, 30, 31, 32, and 33 mounted upon said cabinet; said coil being electrically connected to posts 13 and 20; an electrical alarm, an electrical connection between said alarm and post 33, and between said alarm and post 20; an electrical connection between posts 15 and 22, and between posts 18 and 30; an electrical connection between said battery and the posts 20 and 32; a dynamo, or similar source of current, in circuit with posts 18 and 20; a working circuit connected to posts 13 and 15; and switch-blades 25 and 26 pivoted respectively to posts 22 and 23, said blade 25 being adapted to contact with post 30 or post 32, while said blade 26 is adapted to connect with post 33 or remain disconnected therefrom, substantially as and for the purpose specified.

13. The combination with a cabinet, of a battery and coil arranged within said cabinet, binding-posts 13, 15, 18 and 20 and switch-posts 22, 23, 30, 32 and 33 mounted upon and projecting from said cabinet; an electrical alarm mounted upon said cabinet; an electrical connection within said cabinet and between said alarm and posts 20 and 33; an electrical connection within said cabinet and connecting said coil to posts 13 and 20; an electrical connection within said cabinet and between posts 15 and 22, and between posts 18 and 30; an electrical connection within said cabinet and between said battery and the posts 20 and 32; a dynamo, or similar source of current, in circuit with posts 18 and 20; a working circuit connected to posts 13 and 15; and switch-blades 25 and 26 connected by handle 24 and pivoted respectively to posts 22 and 23, said blade 25 being adapted to contact with post 30 or post 32, while said blade 26 is adapted to connect with post 33 or remain disconnected therefrom, substantially as specified.

14. The combination with a cabinet, of a battery and coil arranged within said cabinet, binding-posts 13, 15, 18 and 20 and switch-posts 22, 23, 30, 31, 32 and 33 mounted upon and projecting from said cabinet; an electrical alarm mounted upon said cabinet; an electrical connection within said cabinet and between said alarm and posts 20 and 33; an electrical connection within said cabinet and connecting said coil to posts 13 and 20; electrical connections within said cabinet and between posts 15 and 22, between posts 18, 30 and 23, between posts 31 and 32, and between the respective poles of said battery and the posts 32 and 20; switch-blades 25 and 26 pivoted respectively to posts 22 and 23; a handle 24 secured to said switch-blades; said switch-blades being adapted to simultaneously engage the posts 30 and 31, or the posts 32 and 33; an explosive-engine having successively-contacting points therein; an electrical connection between said contact-points and the posts 13 and 15; a dynamo driven by said explosive-engine and electrically connected to posts 18 and 20, substantially as specified.

VINCENT G. APPLE.

Witnesses:
H. M. WALSH,
IRA C. KOEHNE.